(12) United States Patent
Li et al.

(10) Patent No.: US 9,032,708 B2
(45) Date of Patent: May 19, 2015

(54) METHOD OF OPERATING A FUEL PROCESSOR (75) Inventors: Xuantian Li, Vancouver (CA); Andre Boutel, Vancouver (CA); Jacobus Neels, Rosedale (CA); William Allison Logan, Victoria (CA)

(73) Assignee: Westport Power Inc., Vancouver (CA)

( * ) Notice: Subject to any disclaimer, the term of this patent is extended or adjusted under 35 U.S.C. 154(b) by 0 days.

(21) Appl. No.: 13/214,078

(22) Filed: Aug. 19, 2011

(65) Prior Publication Data
US 2012/0144741 A1 Jun. 14, 2012

Related U.S. Application Data (63) Continuation of application No. PCT/CA2010/000242, filed on Feb. 19, 2010.

(60) Provisional application No. 61/154,288, filed on Feb. 20, 2009.

(51) Int. Cl.
*F01N 3/00* (2006.01)
*F02M 25/12* (2006.01)
*C01B 3/36* (2006.01)
*F01N 3/023* (2006.01)
*H01M 8/06* (2006.01)

(52) U.S. Cl.
CPC ............. *F02M 25/12* (2013.01); *C01B 3/36* (2013.01); *C01B 2203/0255* (2013.01); *C01B 2203/169* (2013.01); *F01N 3/023* (2013.01); *F01N 2240/30* (2013.01); *F01N 2610/04* (2013.01); *F01N 2610/05* (2013.01); *H01M 8/0618* (2013.01); *Y02E 60/50* (2013.01); *Y02T 10/121* (2013.01)

(58) Field of Classification Search
USPC .................................................... 60/274–324
See application file for complete search history.

(56) References Cited

U.S. PATENT DOCUMENTS

| | | | | |
|---|---|---|---|---|
| 6,997,142 | B2 * | 2/2006 | Wakao et al. | 123/3 |
| 7,040,084 | B2 * | 5/2006 | Ament | 60/274 |
| 8,337,573 | B2 * | 12/2012 | Neels | 48/61 |
| 2004/0144030 | A1 * | 7/2004 | Smaling | 48/211 |
| 2004/0265223 | A1 | 12/2004 | Etievant et al. | |
| 2005/0274107 | A1 * | 12/2005 | Liu et al. | 60/286 |
| 2006/0048502 | A1 * | 3/2006 | Washington et al. | 60/286 |
| 2008/0118423 | A1 * | 5/2008 | Fattic et al. | 423/235 |
| 2008/0145297 | A1 * | 6/2008 | Johannes et al. | 423/418.2 |
| 2008/0209891 | A1 * | 9/2008 | Johannes et al. | 60/287 |
| 2008/0274021 | A1 * | 11/2008 | Neels et al. | 422/198 |

FOREIGN PATENT DOCUMENTS

| | | |
|---|---|---|
| CA | 2428339 A | 11/2004 |
| WO | 2008101334 A | 8/2008 |
| WO | 2008131562 A | 11/2008 |

* cited by examiner

*Primary Examiner* — Jesse Bogue
(74) *Attorney, Agent, or Firm* — Corridor Law Group, P.C.

(57) ABSTRACT

In situations where the demand for syngas is prolonged, a fuel processor is operated continuously to provide a syngas stream for a prolonged period. The equivalence ratio of reactants supplied to the fuel processor is controlled so that a high fuel-conversion efficiency to hydrogen and carbon monoxide is obtained at temperatures correspondent to carbon production balance, where carbon is formed and gasified at approximately the same rate in the fuel processor.

26 Claims, 4 Drawing Sheets

METHOD OF OPERATING A FUEL PROCESSOR

CROSS-REFERENCE TO RELATED APPLICATIONS

This application is a continuation of International Application No. PCT/CA2010/000242, having an international filing date of Feb. 19, 2010, entitled "Pressure Control System And Method". The '242 international application claimed priority benefits, in turn, from U.S. Provisional Patent Application Ser. No. 61/154,288, entitled "Method of Operating a Fuel Processor", filed on Feb. 20, 2009. Each of the '242 international application and the '288 provisional application is hereby incorporated by reference in its entirety.

FIELD OF THE INVENTION

The present technology relates to methods of operating a fuel processor for producing a hydrogen-containing gas stream, such as a syngas stream. The present methods are particularly suitable for fuel processors that are used in engine system applications, and for applications where there is a prolonged demand for syngas.

BACKGROUND OF THE INVENTION

For engine systems in vehicular or other mobile applications where a supply of hydrogen is utilized, due to challenges related to on-board storage of a secondary fuel and the current absence of a hydrogen refueling infrastructure, hydrogen is preferably generated on-board using a fuel processor. The hydrogen-containing gas from the fuel processor can be used to regenerate, desulfate and/or heat engine exhaust aftertreatment devices, can be used as a supplemental fuel for the engine, and/or can be used as a fuel for a secondary power source, for example, a fuel cell. In some applications the demand for the hydrogen-containing gas produced by the fuel processor is highly variable.

One type of fuel processor is a syngas generator (SGG) that can convert a fuel reactant into a gas stream containing hydrogen ($H_2$) and carbon monoxide (CO), known as syngas. Air and/or a portion of the engine exhaust stream can be used as an oxidant reactant for the fuel conversion process. Steam and/or water can optionally be added. The SGG can be conveniently supplied with a fuel comprising the same fuel that is used to operate the engine. Alternatively a different fuel can be used, although this would generally involve a separate secondary fuel source and supply system specifically for the SGG. The syngas can be beneficial in processes used to regenerate exhaust after-treatment devices. For other applications, for example, use as a fuel in a fuel cell, the syngas stream can be additionally processed prior to use.

The thermochemical conversion of a hydrocarbon fuel to syngas is performed in an SGG at high operating temperatures with or without the presence of a suitable catalyst. Parameters including equivalence ratio (ER) and operating (reaction) temperature are typically adjusted in an attempt to increase the efficiency of the fuel conversion process while reducing the generally undesirable formation of carbon (coke or soot) and other deposits, which can cause undesirable effects within the SGG and/or in downstream components.

The term equivalence ratio (ER) herein refers to a ratio between the actual amount of oxygen supplied and the theoretical stoichiometric amount of oxygen which would be required for complete combustion of the fuel. An ER of greater than 1 represents a fuel lean mode (excess oxygen), while an ER of less than 1 represents a fuel rich mode (excess fuel). The term carbon herein includes solid fraction particulates of carbon including amorphous carbon, coke and soot, as well as carbonaceous gums, resins and other deposits.

Over time, carbon accumulation can impede the flow of gases, increase the pressure drop across the SGG and its associated components, and reduce the operating life or durability of the SGG. Large accumulations of carbon also have the potential to create excessive amounts of heat that can damage the SGG if the carbon is converted (for example, combusted, oxidized or gasified) in an uncontrolled manner, for example, in a short period of time.

While many have attempted to eliminate or reduce carbon formation, practically there is an inevitable tendency for carbon to form during the conversion of the fuel into syngas. A particulate filter, also known as a particulate trap, soot filter or soot trap, can be employed at least partially within or downstream of a fuel processor to collect or trap carbon. This allows for increased control and management of the particulates. The particulate filter can be, for example, a wall-flow monolith, a fibrous structure, a foam structure, a mesh structure, an expanded metal type structure or a sintered metal type structure. The particulate filter can be constructed from a suitable material, for example, ceramic materials, and can optionally contain one or more catalysts. Typically, carbon can be allowed to collect until the accumulation begins to adversely affect the gas flow across the particulate filter. A subsequent carbon removal or conversion process can be initiated to remove the carbon particulates collected by the particulate filter, then it will continue to trap carbon particulates. The term "carbon gasification" herein includes one or a combination of oxidation or other carbon conversion processes by which carbon is reacted to form syngas.

In certain applications an SGG can be operated in a so-called "lean-rich" regime, in which the SGG is cycled between operating in a lean mode and operating in a rich mode. This is typically done for carbon removal purposes and/or temperature control purposes and/or to accommodate intermittent syngas demand. During first periods of time, the SGG is operated at a substantially less than stoichiometric ER (or "rich" mode) to produce a syngas stream, which can also result in the formation of carbon. During intervening second periods of time, the SGG is operated at a substantially greater than stoichiometric ER (or "lean" mode) to combust accumulated carbon. A drawback of such a method is that the production of syngas ceases when the SGG is operated in the lean mode, so it is less suitable in situations where the demand for syngas is prolonged or continuous.

SUMMARY OF THE INVENTION

A method of operating a fuel processor to produce a syngas stream comprising hydrogen and carbon-monoxide from a fuel stream and an oxygen-containing gas stream, comprises introducing the fuel stream and the oxygen-containing gas stream into the fuel processor at an equivalence ratio, and sustaining the equivalence ratio at a substantially constant value. The equivalence ratio is preferably selected so that the fuel processor can be operated to produce the syngas stream at that substantially constant equivalence ratio for a prolonged period of time. Preferably the fuel-specific production of hydrogen and carbon monoxide combined is close to maximum while the syngas stream is being produced; and/or carbon gasification is balanced with carbon production while the syngas stream is being produced; and/or the operating temperature of the fuel processor is within 100° C. of a maximum desired operating temperature while the syngas is being produced.

The prolonged period of time can be at least a few minutes, but is preferably several hours. The equivalence ratio is preferably substantially below a stoichiometric value.

The fuel processor can be part of a vehicular or non-vehicular engine system that also comprises an engine that produces an exhaust stream from a fuel stream and an oxygen-containing gas stream, and an exhaust after-treatment assembly. Preferably the fuel processor is a non-catalytic fuel processor, and is used to produce a syngas stream which can be supplied to the exhaust after-treatment assembly and/or other components of the engine system. A method of operating such an engine system comprises:

(a) at least periodically directing at least a portion of the engine exhaust stream to the exhaust after-treatment assembly;
(b) introducing at least a portion of the fuel stream and the oxygen-containing gas stream into the fuel processor at an equivalence ratio; and
(c) sustaining the equivalence ratio at a substantially constant value selected as described above; and
(d) at least periodically directing the syngas stream from the fuel processor to the exhaust after-treatment assembly.

Embodiments of the above-described methods can further comprise trapping carbon particulates formed within the fuel processor, for example, by employing a particulate filter within the fuel processor. A portion of the syngas stream can then be produced in the fuel processor by gasifying carbon trapped in the fuel processor.

In embodiments of the above-described methods, the fuel processor is preferably operated in response to demand for the syngas stream, and can satisfy a prolonged period of demand. For example, it can be sufficient to regenerate one or more exhaust after-treatment devices, such as a diesel particulate filter.

DETAILED DESCRIPTION OF PREFERRED EMBODIMENT(S)

A fuel processor can be operated with reactants supplied at an equivalence ratio (ER) that provides a high fuel-specific $H_2+CO$ (combined $H_2$ and CO) production, for example, at or close to the maximum. "Fuel-specific $H_2+CO$ production" herein refers to the amount of $H_2+CO$ produced per unit of fuel supplied, for example, the number of moles of $H_2+CO$ produced per kilogram of fuel supplied. The maximum fuel-specific $H_2+CO$ production value can vary depending on factors including, for example, type of reactants supplied, temperature at which the fuel conversion reactions occurs and the heat management characteristics of a fuel processor. The higher the fuel-specific $H_2+CO$ production, the greater the efficiency of fuel conversion process to form $H_2+CO$. Operating at or close to the maximum fuel-specific $H_2+CO$ production can also result in a reduced amount of net carbon formation. For situations where the demand for syngas is prolonged, increased fuel-conversion efficiency is particularly beneficial.

During the fuel conversion process, the reaction temperature of a fuel processor is dependent on various things such as: the hydrocarbon fuel being used, the oxidant being used, the equivalence ratio at which reactants are supplied to the fuel processor, whether or not a catalyst is used, the fuel-conversion efficiency, the degree of coke or soot (herein referred as "carbon") formation and the extent to which the fuel processor is cooled or insulated. It can be desirable to operate close to but below a temperature which would cause undesirable effects on the fuel processor, for example, thermal degradation of components. A non-catalytic type fuel processor producing a syngas stream can operate at temperatures of about, for example, 900° C. -1400° C.

Figure 1:
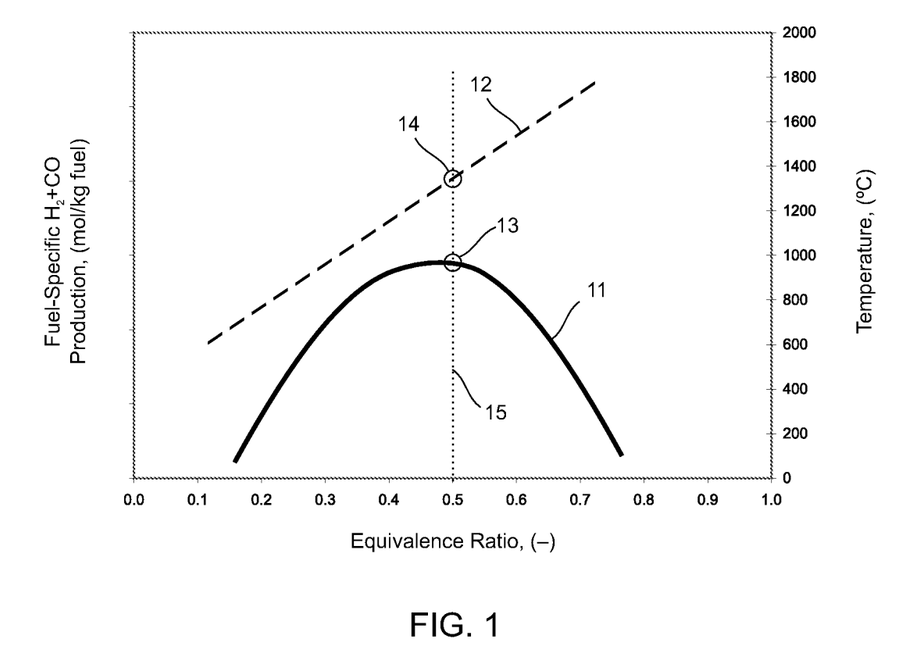
FIG. 1 is a graph (not necessarily to scale) illustrating an example prediction of fuel-specific hydrogen and carbon monoxide production and temperature of a syngas generator (SGG) with varying equivalence ratio of the reactants supplied to the SGG.

FIG. 1 is a graphical illustration showing a simplified prediction of how fuel-specific $H_2+CO$ production of a syngas generator (SGG) can vary as the equivalence ratio (ER) of the reactants supplied to the SGG is varied (solid line 11). A corresponding temperature plot for the SGG is shown as the ER value is varied (dashed line 12). As indicated in the graph, the SGG temperature tends to increase as the ER is increased from zero to about 1 (stoichiometric). The plots are not necessarily to scale, or of the profile shown, as both the fuel-specific $H_2+CO$ production and temperature of the SGG can be dependent on various factors including, for example, the reactants supplied and heat management characteristics of the SGG.

In FIG. 1, fuel-specific $H_2+CO$ production reaches a peak at point 13 on solid line 11, which in the example illustrated in FIG. 1 corresponds to an ER of about 0.5 as indicated by dotted line 15. At this ER the quantity of $H_2+CO$ produced per kilogram of fuel supplied is greatest. From a fuel-conversion efficiency standpoint, operation at or close to this peak fuel-specific $H_2+CO$ production can be desirable. Preferably the SGG is designed and operated so that at this ER the temperature (shown at point 14 on temperature plot 12) is close to but below the desired maximum operating temperature for the SGG. For example, the temperature is preferably sustained within a range extending to about 100° C. below the desired maximum operating temperature for the SGG. At such an ER and temperature, carbon that tends to be formed is gasified, as described in more detail below.

The production of carbon and the gasification of carbon can occur simultaneously during the fuel conversion process. Carbon gasification occurs when carbon reacts with chemically bound oxygen to produce carbon monoxide and hydrogen, via gasification reactions.

By controlling various operating parameters of the SGG, it has been found that the rate at which carbon is produced and gasified can be approximately balanced, so that carbon does not accumulate in the SGG over time (a "carbon neutral" condition). In embodiments of an operating method, an SGG can be operated to produce a syngas stream by supplying the reactants to the SGG at an ER such that the rate at which carbon is produced is about the same as the rate at which carbon is gasified or removed. A carbon neutral condition can provide the advantages of increasing the duration for which an SGG can be operated to produce a syngas stream, without a need for excursions to a lean mode for carbon removal purposes and a resultant interruption to the production of the syngas stream. Preferably the SGG is designed and operated so that at this "carbon neutral" ER the fuel-specific $H_2$+CO production is at or close to maximum, and the temperature is at or close to the desired maximum operating temperature for the SGG, as described in reference to FIG. 1 above, where this corresponds to an ER of about 0.5.

With this approach, an SGG can be operated to produce syngas for a prolonged period of time with the reactants supplied at a substantially constant ER. A prolonged period of time can be, for example, greater than about a few minutes and in some embodiments up to at least several hours. A "substantially constant" ER herein refers to an equivalence ratio that is sustained within a narrow range, for example, within ±0.1 or preferably ±0.05 of a particular value. Preferably the substantially constant equivalence ratio is substantially below 1 (stoichiometric). In some embodiments it is about 0.5.

Operating at an ER where carbon forms and is gasified in the SGG can beneficially contribute to the production of carbon monoxide and hydrogen. During the fuel conversion process, exothermic partial oxidation reactions occur creating heat (for thermo-cracking of fuel reactants and reforming reactions) and water ($H_2O$) vapor comprising chemically bound oxygen. The water vapor reacts with the carbon in gasification reactions increasing the fuel-specific $H_2$+CO production.

Figure 2:
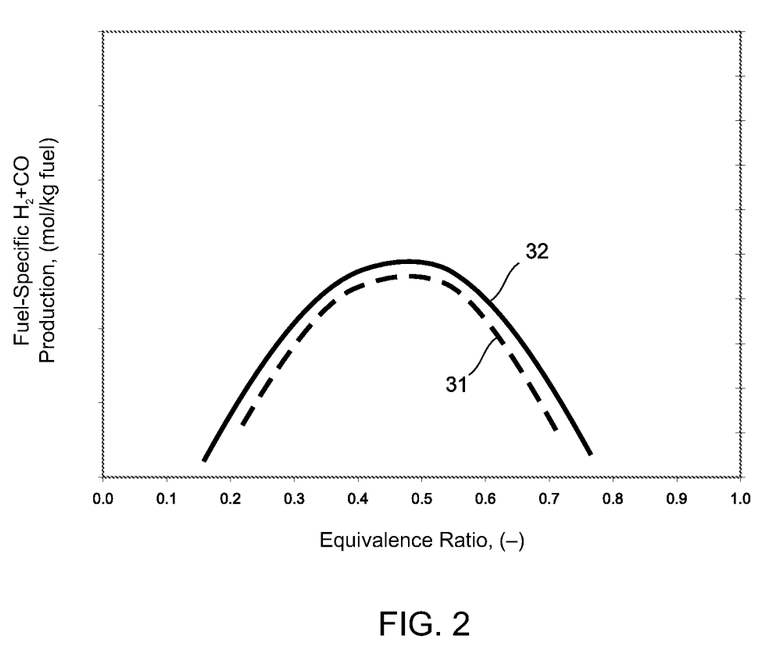
FIG. 2 is a graph (not necessarily to scale) illustrating example predictions of fuel-specific hydrogen and carbon monoxide production of a syngas generator showing the effect of carbon gasification.

FIG. 2 is a graphical illustration showing a simplified prediction of fuel-specific $H_2$+CO production with carbon gasification and without carbon gasification (for example, in a situation where carbon is formed but not trapped within the fuel processor for subsequent gasification). Dashed line 31 shows fuel-specific $H_2$+CO production without a gasification process while solid line 32 shows fuel-specific $H_2$+CO production with a gasification process. Carbon gasification relies on the presence of carbon within the SGG to create the additional hydrogen ($H_2$) and carbon monoxide (CO).

In further embodiments of an operating method, an SGG can be operated to produce a syngas stream by supplying reactants to an SGG at a substantially constant ER value as described above, and a temperature within the SGG can be monitored. If the temperature of the SGG moves above an upper desired temperature value the ER can be selectively adjusted to a lower ER value or slightly richer operating condition (still within the narrow range), reducing the temperature of the SGG. If the temperature of an SGG is below a desired lower temperature value the ER can be selectively adjusted to a higher ER value or slightly leaner operating condition (again, still within the narrow range), increasing the temperature of the SGG. In this way the ER can be sustained at a substantially constant value, but adjusted slightly to compensate for fluctuations in the operating temperature of the SGG.

In other embodiments of an operating method, an SGG can be operated to produce a syngas stream by supplying reactants to an SGG at a substantially constant ER value as described above, and a parameter indicative of carbon accumulation within the SGG can be monitored. When the parameter indicates an undesirable degree of carbon accumulation the ER value can be temporarily adjusted to a higher ER value or slightly leaner operating condition (still within the narrow range) in order to gasify accumulated carbon. The parameter can be, for example, a pressure differential across the SGG, a pressure value of the product syngas stream, or a duration of syngas production and/or SGG operation.

In embodiments of an operating method, an SGG can be selectively operated at a first ER value for a period of time in order to produce a syngas stream and carbon, and then selectively operated at a second ER value for a period of time in order to increase the fuel-specific $H_2$+CO production while gasifying carbon. Optionally, the SGG can be operated at a third ER value which is representative of a desired ER value for operating an SGG for a prolonged period with syngas production at carbon neutral condition. In some embodiments the first ER value is about 0.40 to 0.49; the second ER value is about 0.51 to 0.60 and the third ER value is about 0.49 to 0.51. In further embodiments the first ER value is about 0.45 to 0.49; the second ER value is about 0.51 to 0.55; and the third ER value is about 0.49 to 0.51. The cycle time between operating at the first ER value to produce carbon and operating at the second ER to gasify carbon can be controlled based on one or a combination of, for example, a predetermined time, a sensed pressure, a sensed pressure differential, a sensed temperature, predetermined cycle, a predicted carbon accumulation, a predicted carbon formation, and a duty cycle of the SGG. The flow rates of the reactant supply to the SGG can be reduced during the carbon gasification process to compensate for the additional hydrogen ($H_2$) and carbon monoxide (CO) produced. Selectively producing and gasifying carbon can offer the advantages including, for example, increasing fuel-specific $H_2$+CO production or reducing fuel consumption, reducing a potentially detrimental amount of carbon accumulation within the SGG, increasing the duration at which an SGG can be operated without the interruption to the production of syngas.

Operating with an ER at a substantially constant value selected as described above (for a particular SGG and reactant streams) can enable the prolonged production of a syngas stream from an SGG without performing a carbon removal process that interrupts the syngas output, and without interrupting syngas output in order to control the temperature of the SGG.

Figure 3:
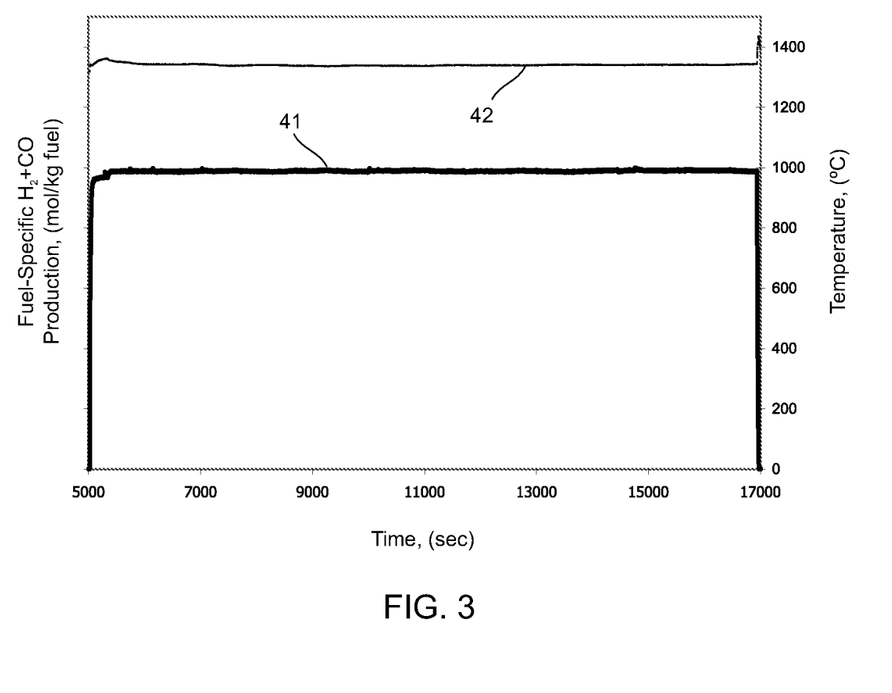
FIG. 3 is a graph of experimental data showing fuel-specific hydrogen and carbon monoxide production from an SGG operating within a temperature range of about 1300° C. to 1400° C. for a prolonged period of time, in this example, more than 3 hours.

FIG. 3 is a graph of experimental data showing fuel-specific $H_2$+CO production from an SGG operating within a temperature range of about 1300° C. to 1400° C. for a prolonged period of time, in this example, more than 3 hours. The SGG was operated at a substantially constant ER value selected at or close to the peak of the fuel-specific $H_2$+CO production. Thick line 41 shows fuel-specific $H_2$+CO production over time, and thin line 42 shows fuel processor temperature over time. The experiment was stopped after about 3.3 hours, but the stable temperature and $H_2$+CO output indicate that operation of the SGG could have continued for an even more prolonged period at this substantially constant ER value.

Thus, in applications where fuel efficiency is a primary concern and an uninterrupted syngas stream is desired for a prolonged period of time, an SGG can be selectively operated with an ER value at or close to the peak of the fuel-specific $H_2$+CO production. Operating with an ER that provides near peak fuel-specific $H_2$+CO production can offer the advantages of an efficient fuel conversion process, and a reduced tendency for carbon formation during the fuel conversion process which can allow for more extended operation of the SGG. Also there tends to be a reduced potential for temperature spikes, as the ER is sustained below a stoichiometric value, rather than being increased to near or past stoichiometric for carbon removal purposes.

Various fuel types have different characteristics, such that the preferred substantially constant ER value is different for different fuels. For example, an ER value that will provide a high fuel-specific $H_2+CO$ production and/or an operating temperature close to the desired maximum and/or carbon neutral operation can vary (for a particular SGG and oxidant stream) depending on the fuel. When a first fuel is mixed with air to provide a first preferred substantially constant ER value, and is then replaced by a second fuel having different characteristics, the following approach can be advantageously applied to determine the preferred ER value for the second fuel. In this method, the SGG is operated at the first preferred substantially constant ER value with the second fuel for a period of time, and carbon loading data is collected. The carbon loading data of the second fuel operated at the first preferred substantially constant ER value is compared to the known carbon loading of the first fuel operated at the first preferred substantially constant ER value, and the comparison is used to calibrate a second preferred substantially constant ER for the second fuel. An SGG controller can be used to perform the calibration in conjunction with operating the SGG.

Figure 4:
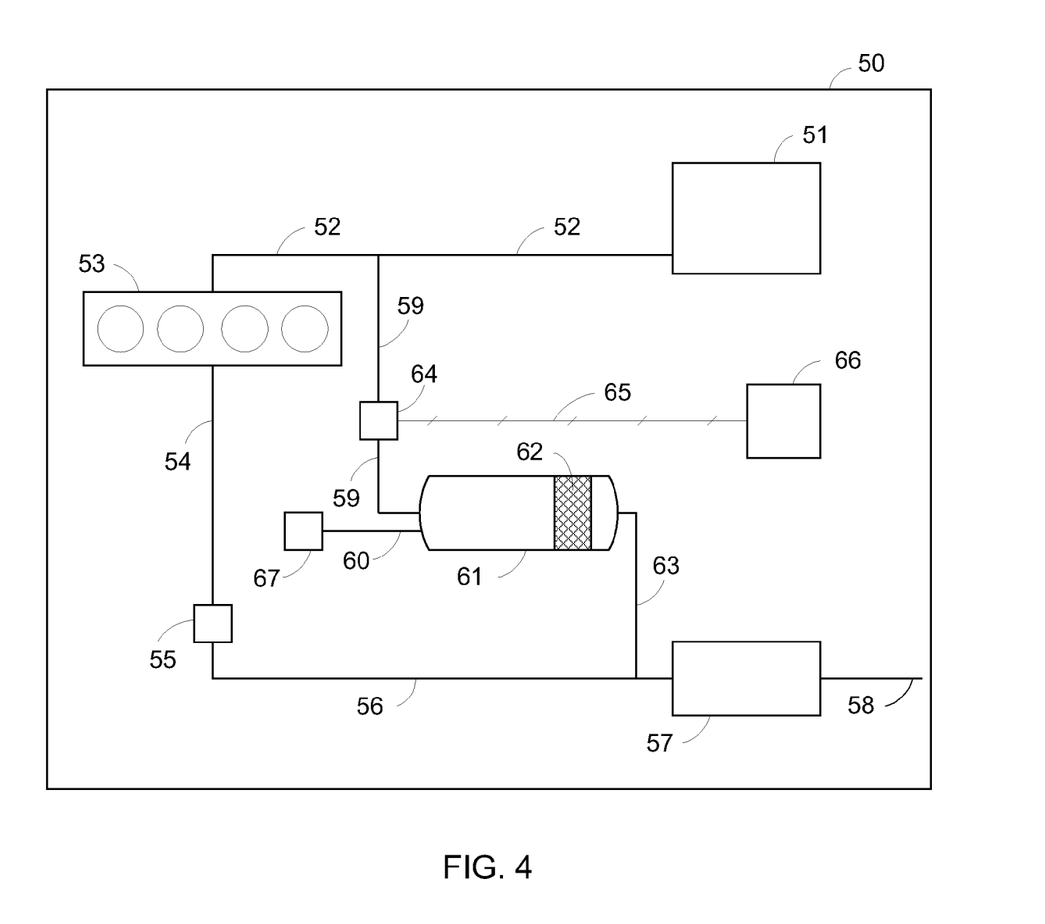
FIG. 4 is a simplified schematic drawing of an embodiment of an engine system comprising an engine, a fuel processor with an internal particulate filter, an exhaust after-treatment assembly and a controller.

FIG. 4 illustrates schematically an embodiment of an engine system 50 with an engine 53, a fuel processor 61, an exhaust after-treatment assembly 57 and a controller 66. In the illustrated embodiment fuel processor 61 is a syngas generator (SGG). In FIG. 4, fuel tank 51 supplies liquid fuel, through fuel supply line 52, to engine 53. An optional fuel filter, fuel pump, fuel pressure regulating device and fuel flow control device (all not shown in FIG. 4) can be integrated into fuel tank 51, or into fuel supply line 52. An optional fuel return line (not shown in FIG. 4) can return fuel back to fuel tank 51. Engine 53, could be a diesel, gasoline, liquefied petroleum gas (LPG), kerosene, natural gas, propane, methanol, ethanol, fuel oil, or other hydrocarbon, alcohol or suitably fueled engine of, for example, a compression ignition or spark ignition type. Engine 53 can be of various designs including reciprocating piston, Wankel, and gas turbine. The engine can be part of a vehicular or non-vehicular system. The engine typically comprises a conventional air supply sub-system (not shown in FIG. 4) to supply air to the engine.

Engine exhaust line 54 directs at least a portion of the engine exhaust stream to exhaust after-treatment assembly 57, via optional turbo-compressor 55 and exhaust line 56. Engine exhaust line 56 and/or exhaust line 54 can incorporate other emissions reduction devices such as exhaust gas recirculation (EGR) systems (not shown in FIG. 4). Turbo-compressor 55 can contain an optional intercooler (not shown in FIG. 4). Exhaust after-treatment assembly 57, can comprise one or more exhaust after-treatment devices including, for example, Lean NOx Traps (LNTs), Diesel Particulate Filters (DPFs), Diesel Oxidation Catalysts (DOCs), Selective Catalytic Reduction (SCR), Catalytic Converter and associated valves, sensors and controllers. The treated engine exhaust gas stream flows through exhaust pipe 58 and exits into the surrounding atmosphere.

In the illustrated embodiment, ambient air is supplied and directed to SGG 61, via SGG oxidant inlet line 60 and air blower 67. Optional flow control devices (not shown in FIG. 4) and/or air blower 67 can receive signals from controller 66 (control lines not shown in FIG. 4) to meter the oxidant reactant stream supplied to SGG 61. Optionally, instead or as well as ambient air, a portion of the engine exhaust stream from engine 53, and/or water or steam from a steam supply sub-system (not shown in FIG. 4) can be introduced into SGG 61 via oxidant inlet line 60 and/or via one or more other inlets, at some points or continuously during operation of SGG 61. A passive flow control device, located within SGG 61 (not shown in FIG. 4) can be used to meter the oxidant reactant. Fuel from fuel tank 51, is supplied from fuel supply line 52 to SGG 61 via SGG fuel inlet line 59 and fuel metering device 64. An optional fuel filter, fuel pump, fuel pressure regulating device, fuel pre-heater and/or fuel heat exchanger (all not shown in FIG. 4) can be integrated into SGG fuel inlet line 59.

SGG 61 converts the fuel and the oxidant streams, into a product stream which can comprise, for example, a syngas stream or a flue gas stream. At least a portion of the product stream produced is supplied to syngas outlet line 63, via particulate filter 62 which is located within SGG 61. Particulate filter 62 collects carbon particulates from the product stream.

In FIG. 4 at least a portion of the syngas stream produced is supplied via syngas outlet line 63 to exhaust after-treatment assembly 57. Syngas outlet line 63 can contain optional valves, sensors, controllers or similar equipment (not shown in FIG. 4). The syngas stream can be employed to regenerate, desulfate and/or to heat one or more devices in exhaust after-treatment assembly 57, and can be directed to other hydrogen-consuming devices within the overall system, such as fuel cells (not shown) and/or to the engine itself. Controller 66 controls the ER of the fuel and oxidant reactants supplied to SGG 61 by communicating with fuel metering device 64 via communication line 65, which adjusts the mass flow of the fuel reactant. Optionally, the fuel reactant supply can be controlled via a passive flow control device and the ER can be adjusted by metering the oxidant reactant with an actively controlled metering device, or supply of both the fuel and oxidant reactant streams can be actively controlled by metering devices which can be adjusted dependently or independently to control the ER.

The methods described herein are suitable for applications where an oxidant reactant contains molecular oxygen, for example, an air stream. The methods are also suitable for applications where an oxidant reactant contains primarily chemically bound oxygen, for example, steam. When an exhaust gas stream from an engine is used as oxidant, a combination of ER ratio and O/C ratio can be used to control and adjust the reactants supplied to a fuel processor. The oxidant reactant is an oxygen-containing gas stream that typically comprises some moisture. In certain embodiments the oxidant reactant comprises an exhaust gas stream from an engine, which can be combined with an air stream. In other embodiments, the oxidant reactant is an air stream which can be provided by, for example, a blower, compressor, supercharger or turbocharger, and selectively adjusted with or without a variable flow control device. In preferred embodiments of the present method, the oxidant reactant is an air stream which is controlled by a variable flow control device which can selectively adjust, for example, the mass flow of the air stream, the oxygen-to-carbon (O/C) ratio and the ER.

In the above-described methods, the fuel and/or oxygen-containing gas stream can be pre-heated. For example, one or both reactant streams can be directed through a heat exchanger coupled to the fuel processor such that heat from the fuel processor is transferred to the stream.

In preferred embodiments of the present methods of operating a fuel processor to produce a syngas stream for a prolonged period, the fuel processor is a non-catalytic partial oxidation syngas generator. The present methods could however offer advantages in other types of fuel processors, reformers or reactors operating on different types of reactant mixtures. For example, the fuel processor could be of various types, such as a catalytic partial oxidizer, a non-catalytic partial oxidizer, a plasma reformer, and/or an autothermal reformer.

The fuel supplied to the fuel processor can be a liquid fuel (herein meaning a fuel that is a liquid when under IUPAC defined conditions of standard temperature and pressure) or a gaseous fuel. Suitable liquid fuels include, for example, diesel, gasoline, kerosene, liquefied natural gas (LNG), fuel oil, methanol, ethanol or other alcohol fuels, liquefied petroleum gas (LPG), or other liquid fuels from which hydrogen can be derived. Alternative gaseous fuels include natural gas and propane. Fuels can include oxygenated fuels. In preferred embodiments of the present method the fuel stream comprises diesel.

The fuel processor can be deployed in various end-use mobile or stationary applications where a hydrogen-consuming device is employed. The product syngas stream can be directed to one or more hydrogen-consuming devices for example an exhaust after-treatment device, a fuel cell, or an engine.

While particular elements, embodiments and applications of the present technology have been shown and described, it will be understood, that the invention is not limited thereto since modifications can be made by those skilled in the art without departing from the scope of the present disclosure, particularly in light of the foregoing teachings.

What is claimed is:

1. A method of operating a fuel processor to produce a syngas stream comprising hydrogen and carbon-monoxide from a fuel stream and an oxygen-containing gas stream, said method comprising:
   (a) introducing said fuel stream and said oxygen-containing gas stream into said fuel processor at an oxygen-containing gas to fuel equivalence ratio; and
   (b) sustaining said equivalence ratio at a substantially constant value, wherein said fuel processor is operated to produce said syngas stream at said substantially constant equivalence ratio,
   wherein said fuel processor is a non-catalytic fuel processor having no catalyst disposed upstream of said fuel processor and said equivalence ratio is less than 1 and selected such that fuel-specific production of hydrogen and carbon monoxide combined is substantially at the maximum at which said syngas stream is produced and carbon gasification is balanced with carbon production where both carbon gasification and carbon production occur while said syngas stream is being produced.

2. The method of claim 1 further comprising employing a particulate filter within said fuel processor to trap carbon particulates.

3. The method of claim 2 further comprising producing a portion of said syngas stream by gasifying carbon trapped in said particulate filter.

4. The method of claim 1 wherein said equivalence ratio is between 0.40 and 0.60.

5. The method of claim 1 wherein said fuel comprises diesel and said equivalence ratio is 0.5.

6. The method of claim 1 wherein the operating temperature of said fuel processor is within 100° C. of a maximum desired operating temperature while said syngas is being produced.

7. The method of claim 1 further comprising monitoring a parameter indicative of carbon accumulation within said fuel processor and temporarily increasing said substantially constant equivalence ratio value when said parameter indicates carbon accumulation within said fuel processor, wherein said equivalence ratio value is maintained within a predetermined range.

8. The method of claim 7 wherein said parameter is a pressure differential across at least a portion of said fuel processor.

9. The method of claim 1 further comprising monitoring a temperature within said fuel processor and temporarily decreasing said substantially constant equivalence ratio value when said temperature exceeds a threshold temperature value, wherein said equivalence ratio value is maintained within a predetermined range.

10. The method of claim 1 further comprising monitoring a temperature within said fuel processor and temporarily decreasing said substantially constant equivalence ratio value when said temperature exceeds a threshold temperature value, wherein said equivalence ratio value is maintained within a predetermined range.

11. A method of operating an engine system, said engine system comprising an engine that produces an exhaust stream, an exhaust after-treatment assembly, and a non-catalytic fuel processor for producing a syngas stream comprising hydrogen and carbon-monoxide from a fuel stream and an oxygen-containing gas stream, said method comprising:
   (a) at least periodically directing at least a portion of said engine exhaust stream to said exhaust after-treatment assembly;
   (b) introducing said fuel stream and said oxygen-containing gas stream into said non-catalytic fuel processor at an oxygen-containing gas to fuel equivalence ratio; and
   (c) sustaining said equivalence ratio at a substantially constant value, wherein said fuel processor is operated to produce said syngas stream at said substantially constant equivalence ratio; and
   (d) at least periodically directing said syngas stream from said fuel processor to said exhaust after-treatment assembly,
   wherein said equivalence ratio is less than 1 and selected such that fuel-specific production of hydrogen and carbon monoxide combined is substantially at the maximum at which said syngas stream is produced and carbon gasification is balanced with carbon production where both carbon gasification and carbon production occur while said syngas stream is being produced and wherein said engine system has no catalyst disposed upstream of said non-catalytic fuel processor.

12. The method of claim 11 further comprising employing a particulate filter within said fuel processor to trap carbon particulates.

13. The method of claim 12 further comprising producing a portion of said syngas stream by gasifying carbon trapped in said particulate filter.

14. The method of claim 11 wherein said engine system is part of a vehicle.

15. The method of claim 11 wherein said engine system is part of a vehicle.

16. A method of operating a fuel processor to produce a syngas stream comprising hydrogen and carbon-monoxide from a fuel stream and an oxygen-containing gas stream, said method comprising:
   (a) introducing said fuel stream and said oxygen-containing gas stream into said fuel processor at an oxygen-containing gas to fuel equivalence ratio; and
   (b) sustaining said equivalence ratio at a substantially constant value, wherein said fuel processor is operated to produce said syngas stream at said substantially constant equivalence ratio, wherein said fuel processor is a non-catalytic fuel processor having no catalyst disposed upstream of said fuel processor, and said equivalence ratio is less than 1 and selected such that fuel-specific production of hydrogen and carbon monoxide combined is substantially at the maximum at which said syngas stream is produced and carbon gasification is balanced with carbon production while said syngas stream is being produced.

17. The method of claim 16 further comprising employing a particulate filter within said fuel processor to trap carbon particulates.

18. The method of claim 17 further comprising producing a portion of said syngas stream by gasifying carbon trapped in said particulate filter.

19. The method of claim 16 wherein said equivalence ratio is between 0.40 and 0.60.

20. The method of claim 16 wherein said fuel comprises diesel and said equivalence ratio is 0.5.

21. The method claim 16 wherein the operating temperature of said fuel processor is within 100° C. of a maximum desired operating temperature while said syngas is being produced.

22. The method of claim 16 further comprising monitoring a parameter indicative of carbon accumulation within said fuel processor and temporarily increasing said substantially constant equivalence ratio value when said parameter indicates carbon accumulation within said fuel processor, wherein said equivalence ratio value is maintained within a predetermined range.

23. The method of claim 22 wherein said parameter is a pressure differential across at least a portion of said fuel processor.

24. A method of operating an engine system, said engine system comprising an engine that produces an exhaust stream, an exhaust after-treatment assembly and a non-catalytic fuel processor for producing a syngas stream comprising hydrogen and carbon-monoxide from a fuel stream and an oxygen-containing gas stream, said method comprising:

(a) at least periodically directing at least a portion of said engine exhaust stream to said exhaust after-treatment assembly;

(b) introducing said fuel stream and said oxygen-containing gas stream into said non-catalytic fuel processor at an oxygen-containing gas to fuel equivalence ratio; and (c) sustaining said equivalence ratio at a substantially constant value, wherein said fuel processor is operated to produce said syngas stream at said substantially constant equivalence ratio; and (d) at least periodically directing said syngas stream from said fuel processor to said exhaust after-treatment assembly, wherein said equivalence ratio is less than 1 and selected such that fuel-specific production of hydrogen and carbon monoxide combined is substantially at the maximum at which said syngas stream is produced and carbon gasification is balanced with carbon production while said syngas stream is being produced; and wherein said engine system has no catalyst disposed upstream of said non-catalytic fuel processor.

25. The method of claim 24 further comprising employing a particulate filter within said fuel processor to trap carbon particulates.

26. The method of claim 25 further comprising producing a portion of said syngas stream by gasifying carbon trapped in said particulate filter.

* * * * *